US006333845B1

(12) United States Patent
Hashizawa et al.

(10) Patent No.: US 6,333,845 B1
(45) Date of Patent: Dec. 25, 2001

(54) POWER-SUPPLY BREAKER APPARATUS

(75) Inventors: Shigemi Hashizawa; Hidehiko Kuboshima; Masayuki Karamatsu, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/487,664

(22) Filed: Jan. 19, 2000

(30) Foreign Application Priority Data

Jan. 27, 1999 (JP) ........................................... 11-018940

(51) Int. Cl.[7] .............................. H02B 1/18; H02B 1/26; H01H 85/20

(52) U.S. Cl. ......................... 361/642; 361/626; 361/646; 337/194

(58) Field of Search .................................... 361/104, 626, 361/642, 646, 833, 835, 837; 337/1, 4, 5, 9, 142, 186, 194, 208; 307/112, 116, 125, 130, 131, 149; 315/88, 93, 129, 130, 136; 340/500, 522, 540, 635, 652, 657, 660, 638, 639

(56) References Cited

U.S. PATENT DOCUMENTS

| | | | | |
|---|---|---|---|---|
| 1,966,716 | * | 7/1934 | Green | 200/114 |
| 2,186,813 | * | 1/1940 | Adam et al. | 200/114 |
| 2,289,122 | * | 7/1942 | Jackson et al. | 200/114 |
| 2,636,096 | * | 4/1953 | Di Blasi | 200/115.5 |
| 3,030,474 | * | 4/1962 | Scott, Jr. | 200/133 |
| 3,202,788 | * | 8/1965 | George | 200/133 |
| 3,358,100 | * | 12/1967 | Schleicher | 200/114 |
| 3,379,842 | * | 4/1968 | Downs et al. | 200/114 |
| 3,775,727 | * | 11/1973 | Wise | 339/14 R |
| 3,840,781 | * | 10/1974 | Brown | 317/16 |
| 4,283,100 | * | 8/1981 | Griffin et al. | 339/19 |
| 4,500,862 | * | 2/1985 | Shedd | 337/32 |
| 4,767,359 | * | 8/1988 | Martell | 439/535 |
| 4,871,924 | * | 10/1989 | Sellati | 307/86 |
| 5,906,508 | * | 5/1999 | Jeffcoat | 439/509 |
| 5,973,418 | * | 10/1999 | Ciesielka et al. | 307/130 |
| 5,993,225 | * | 11/1999 | Johnson et al. | 439/136 |

FOREIGN PATENT DOCUMENTS

| | | | | |
|---|---|---|---|---|
| 0411216-A1 | * | 2/1991 | (EP) | 439/101 |
| 11-176507-A | * | 7/1999 | (JP) | H01R/13/44 |

* cited by examiner

*Primary Examiner*—Leo P. Picard
*Assistant Examiner*—Anatoly Vortman
(74) *Attorney, Agent, or Firm*—Finnegan, Henderson, Farabow, Garrett & Dunner, L.L.P.

(57) ABSTRACT

A power-supply breaker apparatus of the present invention includes a fuse provided between a power supply and a load in an electric circuit, an apparatus main body for housing the fuse, a first bus bar whose one end is fixed to one fuse terminal of the fuse, a second bus bar having one end fixed to one of the power supply and the load, a plug housing chamber for housing the plug in the apparatus main body movably in a fitting/detaching direction, and a pair of plug side terminals which become conductive with each other in the plug. The other end of the first bus bar is extended so as to be composed as one terminal of the pair of main body side terminals, and the other end of the second bus bar is extended parallel with the first bus bar so as to be composed as the other terminal of the pair of main body side terminals. Respective terminal insertion widths of the pair of plug side terminals are wider than corresponding widths of the pair of main body side terminals.

7 Claims, 5 Drawing Sheets

POWER-SUPPLY BREAKER APPARATUS

BACKGROUND OF THE INVENTION

The present invention relates to a power-supply breaker apparatus, and more specifically relates to a power-supply breaker apparatus for breaking an electric circuit suitably when operational maintenance for a power-supply circuit and equipments of an electric automobile and the like is performed.

In recent years, since an transportation equipment such as an electric automobile is provided with a high-voltage portion for driving a motor, it is equipped with a power-supply breaker apparatus taking maintenance into consideration.

SUMMARY OF THE INVENTION

According to the examination by the inventors, a power-supply breaker apparatus shown in FIGS. 8 and 9 is suggested.

As shown in FIGS. 8 and 9, a pair of main body side terminals 2 and 3 are provided in an apparatus main body 1 of the power-supply breaker apparatus so as to be fastened thereto by screws 4.

Base ends of a pair of operation side terminals 5 and 6 are rotatively supported to the apparatus main body 1, and the ends of the pair of operation side terminals 5 and 6 are connected at a holding section 7.

In such a structure, the holding section 7 is rotated in a counterclockwise direction in the drawing, and the pair of operation side terminals 5 and 6 are fitted between nipping end pieces 2*a* and 2*a* and between nipping end pieces 3*a* and 3*a* of the pair of main body side terminals 2 and 3 so that the electric circuit is conductive.

Meanwhile, the holding section 7 in this state is rotated in a clockwise direction in the drawing and the pair of operation side terminals 5 and 6 are detached from the pair of main body side terminals 2 and 3 so that the electric circuit is broken.

Therefore, when the transpiration equipment equipped with the power-supply breaker apparatus is maintained, the electric circuit can be broken.

However, in this power-supply breaker apparatus, since the pair of main body side terminals 2 and 3, which are receiving sides of the pair of operation side terminals 5 and 6, are fixed to the apparatus main body 1, if a pitch P1 between the pair of main body side terminals 2 and 3 differs from a pitch P2 between the pair of operation side terminals 5 and 6, a fit detaching force between both the terminals increases so that operability of the holding section 7 is deteriorated.

Therefore, the present invention has been achieved in order to solve the above examined problem. It therefore is an object of the present invention to provide a power-supply breaker apparatus in which even in the case where a pitch between one pair of terminals for making conductive/breaking an electric circuit differs from a pitch between the other pair of terminals, a fit detaching force (fitting/detaching force) between both the terminals does not increase and operability of a plug can be improved.

A power-supply breaker apparatus of the present invention includes a fuse provided between a power supply and a load in an electric circuit, an apparatus main body for housing the fuse, a first bus bar whose one end is fixed to one fuse terminal of the fuse, a second bus bar fixed to one of the power supply and the load, a plug housing chamber for housing a plug movably in the fitting/detaching direction in the apparatus main body, and a pair of plug side terminals being conductive with each other in the plug. Here, the electric circuit becomes conductive via the fuse. The other end of the first bus bar is extended so as to be composed as one terminal of the pair of main body side terminals, and the other end of the second bus bar is extended parallel with the first bus bar so as to be composed as the other terminal of the pair of main body side terminals. Respective terminal insertion widths of the pair of plug side terminals are wider than the corresponding widths of the pair of main body side terminals. When the plug moves in the fitting/detaching direction, the pair of plug side terminals are freely fitted into and detached from the pair of main body side terminals.

In this structure, if an error such as mounting looseness occurs when the one end of the second bus bar is fixed to an electrode fixing section, a displacement due to the error occurs in a widthwise direction of the main body side terminal of the second bus bar. Since the width of the terminal insertion portion of the plug side terminal is large, the mounting error of the second bus bar can be absorbed.

Therefore, a fitting/detaching force between the main body side terminals and the plug side terminals can be approximately constant.

Further, since both the first bus bar and the second bus bar are extended so that their other ends are composed as the main body side terminals, a number of parts can be reduced and thus the cost can be lowered.

In addition, it is suitable for convenience in the structure that the pair of plug side terminals are formed by one plate member.

In addition, a pair of conduciveness detection-use terminals for detecting the conductive state of the electric circuit may be provided in the apparatus main body and the plug.

According to this structure, the conductive and breaking states of the electric circuit can be detected easily and securely.

In addition, the plug may have a plug main body and a slider which is movable in the terminal fitting/detaching direction with respect to the plug main body.

According to this structure, connection between the main body side terminals and the plug side terminals can be secured.

More specifically, in the case where the plug main body is not fitted to the terminal fit completing position of the apparatus main body, the plug main body is not engaged with the slider. For this reason, even if the slider of the plug is tried to be moved in the terminal fitting direction with respect to the plug main body, the plug cannot be moved. As a result, an operator can know that the plug main body is in the middle of the fitting, and thus the incomplete fitting of the plug into the apparatus main body can be prevented previously.

More concretely, it is more preferable that the pair of plug side terminals are provided to the plug main body, and the pair of conduciveness detection-use terminals of the plug are provided to the slider.

According to this structure, the conductive and breaking states of the electric circuit can be detected more easily and securely by the simple structure.

In addition, it is preferable that the plug main body is freely engaged and detached according to a movement of the slider in the fitting/detaching direction in order to secure this operation.

In addition, it is preferable that fitting/detaching timing of the pair of plug side terminals and the pair of main body side terminals differs from timing of the pair of conduciveness detection-use terminals of the apparatus main body and the pair of conduciveness detection-use terminals of the plug.

According to this structure, a difference of time is set in the fitting/detaching timing of the pair of main body side terminals and the pair of plug side terminals so that the pair of conduciveness detection-use terminals on the apparatus main body side can be fitted into and detached from the pair of conduciveness detection-use terminals on the slider side of the plug. As a result, an influence of a residual electric current can be suppressed efficiently.

DETAILED DESCRIPTION OF THE PREFERRED EMBODIMENT

Figure 1:
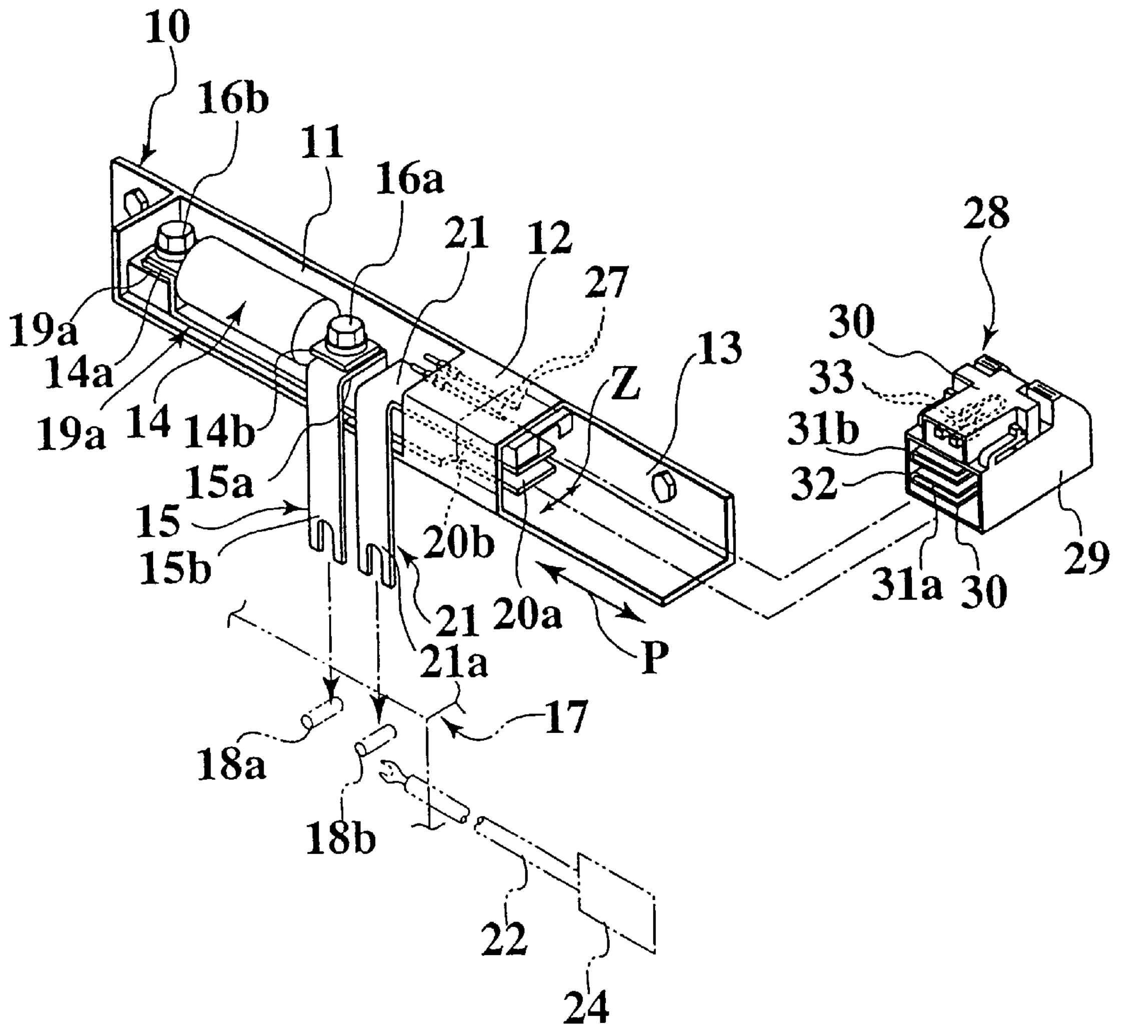
FIG. 1 is a perspective view of a power-supply breaker apparatus according to an embodiment of the present invention.
Figure 2:
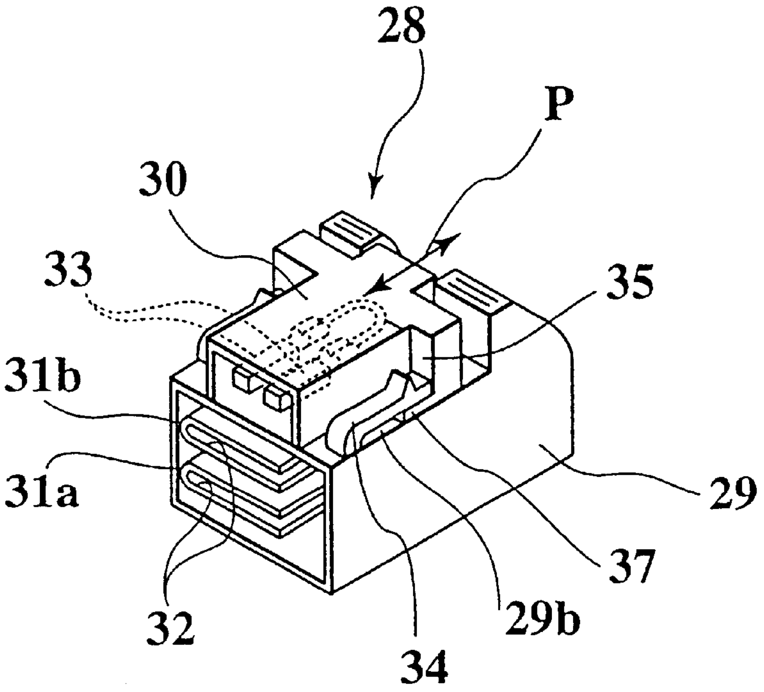
FIG. 2 is a perspective view of a plug of the power-supply breaker apparatus according to the embodiment.
Figure 3:
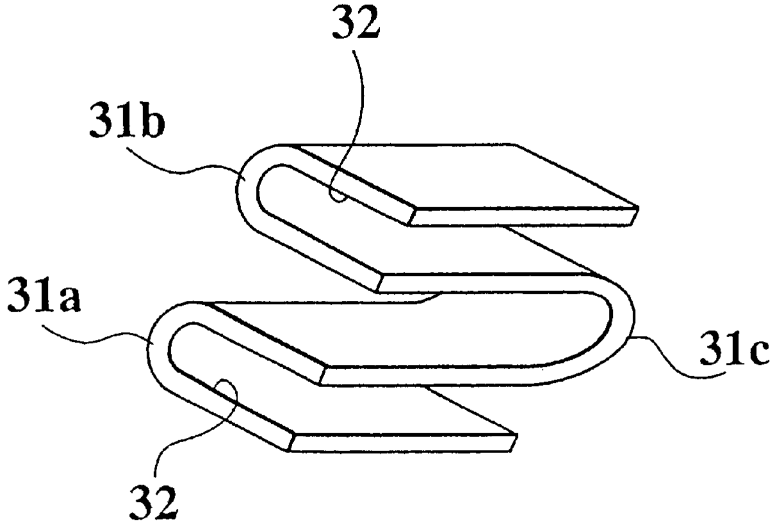
FIG. 3 is a perspective view of a plug side terminal of the power-supply breaker apparatus according to the embodiment.

There will be detailed below an embodiment of the present invention with reference to the diagrams.

As shown in FIGS. 1 through 7, in a box-shaped apparatus main body 10, made of synthetic resin, of a power-supply breaker apparatus, a fuse housing chamber 11, a quadratic piped terminal housing chamber 12 and a plug housing chamber 13 are provided on a straight line.

A fuse 14 is housed in the fuse housing chamber 11.

The other fuse terminal 14*b* of the fuse 14 as well as one end 15*a* of a power-supply side bus bar 15 is fastened by a bolt 16*a*. The other end 15*b* of the power-supply side bus bar 15 is connected and fixed with a battery post (electrode fixing section) 18*a* on a power-supply side of a battery (power supply) 17 via predetermined means.

Meanwhile, one fuse terminal 14*a* of the fuse 14 as well as one end 19*a* of a first bus bar 19 is fastened by a bolt 16*b* so that the fuse 14 is electrically connected with the first bus bar 19.

The first bus bar 19 is formed by an electrically conductive member such as a copper plate, and is passes below the fuse 14 so as to be extended to the terminal housing chamber 12. The other end of the first bus bar 19 becomes one main body side terminal 20*a*.

A second bus bar 21 is formed by an electrically conductive member such as a copper plate, and its one end 21*a* as well as one end of an electric wire 22 is connected and fixed with a battery post (electrode fixing section) 18*b* on a load side of the battery 17 via predetermined means.

The second bus bar 21 is supported at only the one terminal 21*a*, and the other end of the electric wire 22, which was electrically connected with the second bus bar 21, is connected with a motor (load) 24.

A boundary between a vertical portion 21*b* and a horizontal portion 21*c* positioned on an upper end of the vertical portion 21*b* of the second bus bar 21 is bent in a vertical direction so as to have a substantially L-shaped front surface. The horizontal portion 21*c* of the second bus bar 21, which was bent in the vertical direction, is positioned parallel with the first bus bar 19 with a predetermined interval and is extended to the terminal housing chamber 12. The other end of the horizontal portion 21*c* of the second bus bar 21 becomes the other main body side terminal 20*b*.

Figure 4:
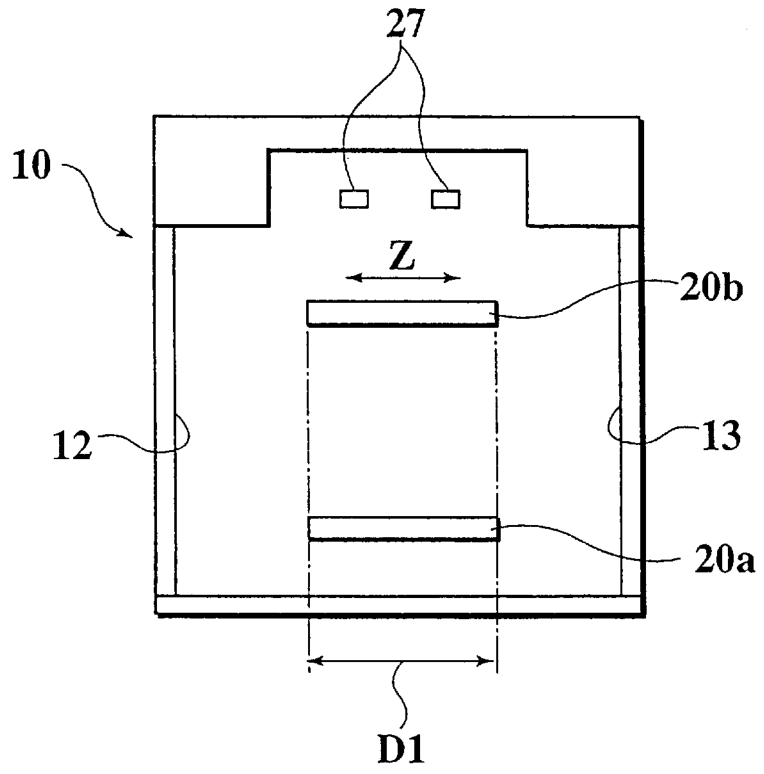
FIG. 4 is an explanatory diagram that the plug of the power-supply breaker apparatus according to the embodiment is viewed from the terminal side.

In addition, as mainly shown in FIGS. 1 and 4, a pair of conduciveness detection-use terminals 27, 27 are positioned in the terminal housing chamber 12. Respective electric wires, which are connected with the pair of conduciveness detection-use terminals 27, 27, are led to a conduciveness detection circuit (not shown).

A plug 28 is positioned in the plug housing chamber 13 so as to be slidably in a terminal fitting/detaching direction (a direction P in FIG. 1).

The plug 28 is composed of a plug main body 29 made of synthetic resin, and a slider 30 made of synthetic resin which slides on the plug main body 29.

A pair of plug side terminals 31*a* and 31*b* are projected in a hood section 29*a* of the plug main body 29. Electrical conduciveness is obtained between the pair of plug side terminals 31*a* and 31*b*. More concretely, the pair of plug side terminals 31*a* and 31*b* and their electrically conductive portions 31*c* are formed in such a manner that a copper plate material having a spring property is bent so as to form a pair of U-shaped portions and a connection portion for connecting the U-shaped portions. Namely, the pair of U-shaped portions are composed as the pair of plug side terminals 31*a* and 31*b*, and terminal insertion grooves 32, 32, which are surrounded respectively by the U-shaped portions and are terminal insertion portions, are formed.

Figure 5:
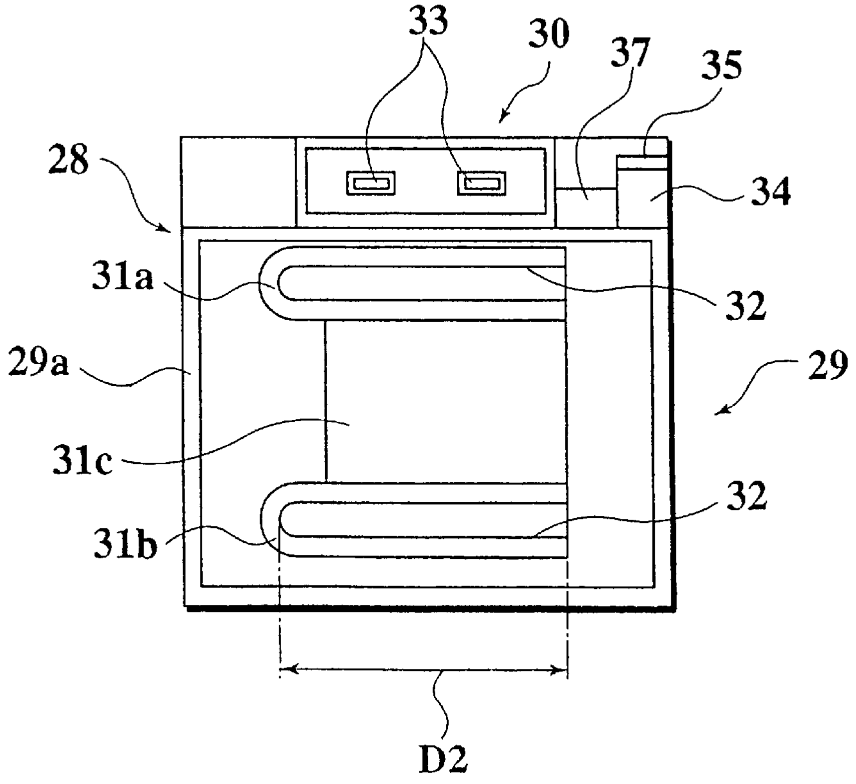
FIG. 5 is an explanatory diagram that the plug of the power-supply breaker apparatus according to the embodiment is viewed from the terminal side.

As mainly shown in FIGS. 4 and 5, a width D2 of the terminal insertion grooves 32, 32 of the pair of plug side terminals 31*a* and 31*b* is set so as to be longer than a width D1 of the pair of main body side terminals 20*a* and 20*b* ($D1<D2$).

The slider 30 is provided with a pair of conduciveness detection-use terminals 33, 33, and electrical conduciveness is obtained between the pair of conduciveness detection-use terminals 33, 33.

Figure 6:
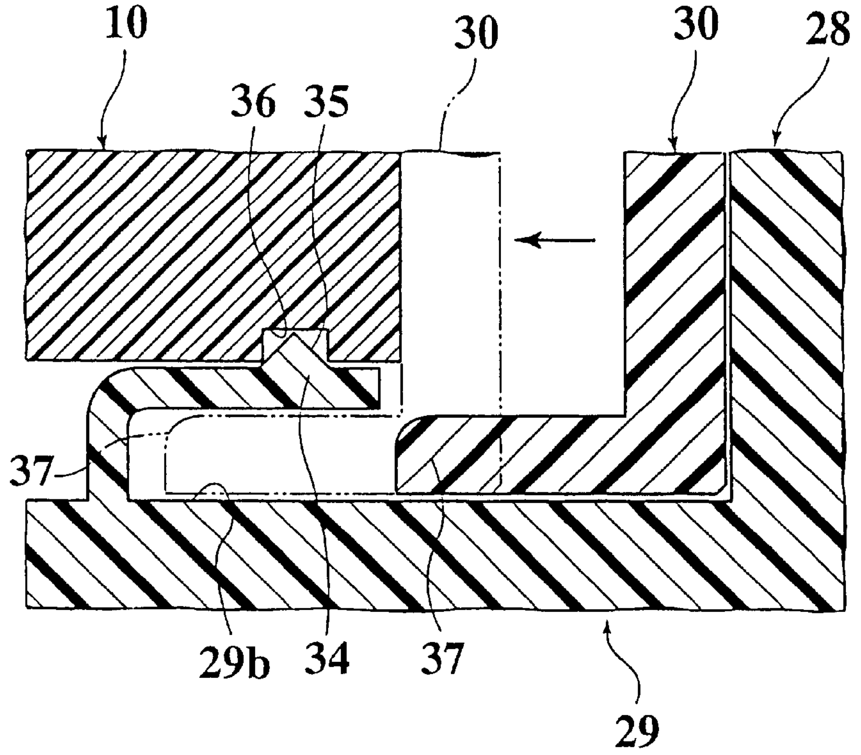
FIG. 6 is an enlarged cross section of a main section of the power-supply breaker apparatus according to the embodiment.

Further, as shown in FIG. 6, a flexible and elastic arm 34 is projected integrally from the plug main body 29. The elastic arm 34 is positioned so that its free end is parallel with an upper surface 39*b* of the plug main body 29. A triangular prism-shaped engagement projection (engagement section) 35 is projected integrally from an upper surface of the free end of the elastic arm 34. A concave engagement groove (engagement section) 36 into which the engagement projection 35 is inserted is formed in a predetermined position of the apparatus main body 10, and the positional relationship is set so that the engagement projection 36 is engaged with the engagement groove 36 in a position where the plug main body 29 is inserted to a terminal fit completing position.

Further, a lock-use projected portion 37 is projected integrally from a position of the slider 30 which faces the elastic arm 34. Since the free end of the elastic arm 34 shifts in the state that the engagement projection 35 is not inserted into the engagement groove 36, the lock-use projection portion 37 bumps against the engagement projection 35 so that the movement of the slider 30 in the terminal fitting direction is regulated. As a result, as shown in FIG. 6, only in the state that the engagement projection 35 is inserted into the engagement groove 36, the movement of the slider 30 in the terminal fitting direction is allowed.

The engagement projection 35 is freely engaged with and detached from the engagement groove 36 according to the movement of the slider in the terminal fitting/detaching direction P. Namely, when the slider 30 is moved in the terminal fitting direction, the engagement projection 35 is engaged with the engagement groove 36, and the plug main body 29 is locked in the apparatus main body 10. Meanwhile, when the slider 30 is moved in the terminal detaching direction, the lock is released so that the plug main body 29 can be removed.

There will be described below an operation of the power-supply breaker apparatus having the above structure according to the present embodiment.

At first, when the plug 28 is positioned in the plug housing chamber 13 and the plug main body 29 of the plug 28 is slid in the terminal fitting direction, the main body side terminals 20*a* and 20*b* are fitted into the terminal insertion grooves 32, 32 of the plug side terminals 31*a* and 31*b*.

Next, the conductive state is obtained between the pair of main body side terminals 20*a* and 20*b* via the pair of plug side terminals 31*a* and 31*b*, and the power of the battery 17 can be supplied to the motor 24.

When the plug main body 29 is inserted to the terminal fit completing position, the engagement projection 35 of the plug main body 29 is fitted into the engagement groove 36 of the apparatus main body 10.

Next, when the slider 30 of the plug 28 is slid in the terminal fitting direction, the lock-use projected portion 37 of the slider 30 is inserted into a space between the elastic arm 34 and the upper surface 39*b* of the plug main body 29, and the conduciveness detection-use terminals 33, 33 on the slider 30 side are fitted into the conduciveness detection-use terminals 27, 27 on the apparatus main body 10 side.

As a result, a conductive state is obtained between the pair of conduciveness detection-use terminals 27, 27 on the apparatus main body 10 side via the pair of conduciveness detection-use terminals 33, 33 on the slider 30 side so that the conductiveness of the electric circuit can be detected.

In the state that the lock-use projected portion 37 of the slider 30 is inserted into the space between the elastic arm 34 and the upper surface 39*b* of the plug main body 29, the lock-use projected portion 37 regulates the movement of the elastic arm 34 in a downward direction, and thus the plug main body 29 is not moved in a terminal detaching direction (terminal pulling-out direction).

Therefore, the plug main body 29 can be efficiently prevented from detaching due to oscillation.

Here, in the case where the plug main body 29 is not completely fitted to the terminal fit completing position, namely, in the middle of the fitting during the above operation, when the slider 30 is tried to be slid in the terminal fitting direction, the lock-use projected portion 37 of the slider 30 bumps against the free end of the elastic arm 34 of the plug main body 29 so that the movement of the slider 30 in the terminal fitting direction is regulated.

As a result, since an operator can confirm that the plug main body 29 in the middle of the fitting, incomplete fitting of the plug 28 can be prevented previously.

Further, in the case where maintenance or the like is executed, when the slider 30 in the plug housing chamber 13 is slid in the terminal detaching direction with respect to the plug main body 29, the conduciveness detection-use terminals 33, 33 on the slider 30 side are pulled out of the conduciveness detection-use terminals 27, 27 on the apparatus main body 10 side.

As a result, an open state is obtained between the conduciveness detection-use terminals 27, 27 on the apparatus main body 10 so that the breaking of a connection confirming-use circuit is detected. At the same time, since the lock-use projected portion 37 of the slider 30 is pulled out of the space between the elastic arm 34 and the upper surface 39*a* of the plug main body 29, the plug main body 29 is movable in the terminal detaching direction.

Next, when the plug main body 29 is slid in the terminal detaching direction, the main body side terminals 20*a* and 20*b* are pulled out of the terminal insertion grooves 32, 32 of the plug side terminals 31*a* and 31*b*. As a result, between the main body side terminals 20*a* and 20*b*, namely, the power-supply circuit (electric circuit) is in the breaking state so that the power of the battery 17 is not supplied to the motor 24.

In this state, the electric circuit is in the breaking state, and the maintenance or the like is executed suitably.

Figure 7:
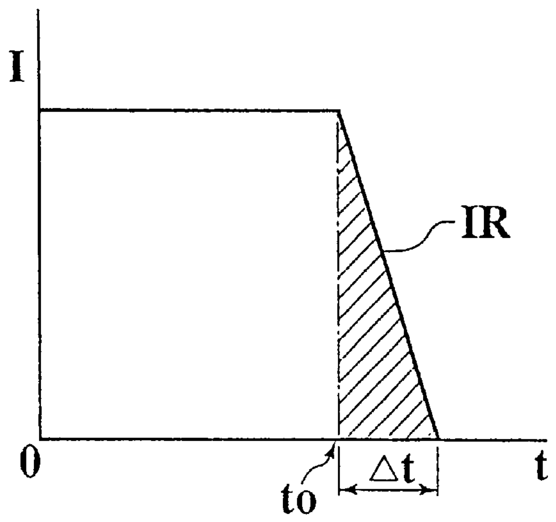
FIG. 7 is a characteristic chart showing a state of a residual electric current when a contact between a pair of main body side terminals and a pair of plug side terminals in the power-supply breaker apparatus according to the embodiment is broken.
Figure 8:
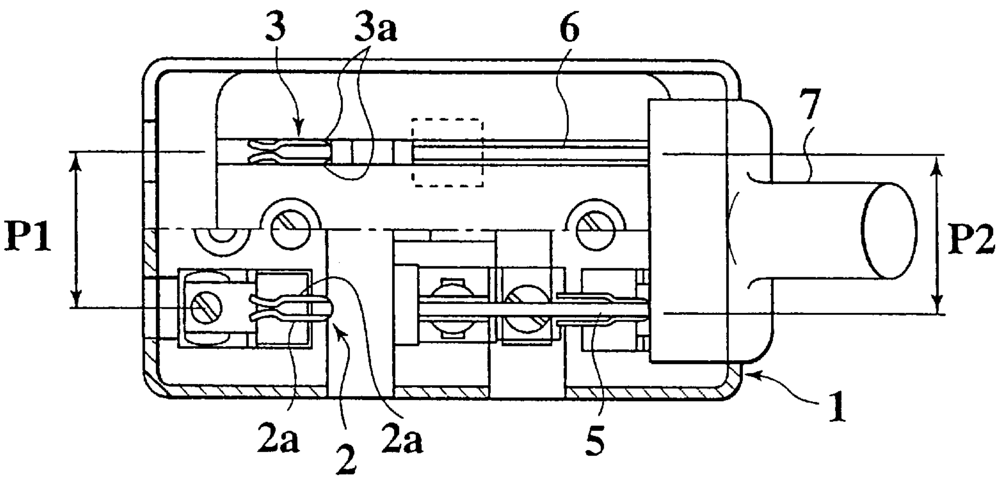
FIG.8 PRIOR ART
FIG. 8 is a plan view showing one portion, broken away, of the power-supply breaker apparatus according to an examination of the inventors.
Figure 9:
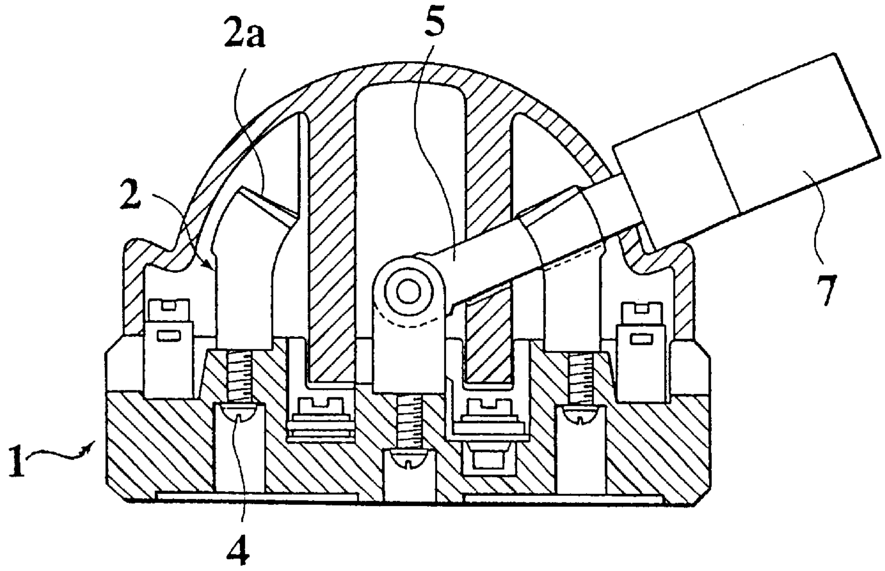
FIG.9 PRIOR ART
FIG. 9 is a sectional view of the power-supply breaker apparatus.

As mentioned above, in the present embodiment, a difference of time is set between the breaking of the connection confirming-use circuit and the breaking of the power-supply circuit, but as shown in FIG. 7, an influence of a residual electric current may be suppressed. Namely, since a difference of time is set between fitting/detaching timing of the main body side terminals 20*a* and 20*b* and the plug side terminals 31*a* and 31*b* and fitting/detaching timing of the conduciveness detection-use terminals 27, 27 on the apparatus main body side and the conduciveness detection-use terminals 33, 33 on the slider 30 side, after a residual electric current $I_R$ which is gradually reduced is collapsed, the operation can be performing for $\Delta t$ after timing $t_0$ at which the power-supply circuit is broken, and thus maintainability can be further improved.

In addition, in the present embodiment, since the other end of the second bus bar 21 is bent in the vertical direction, when the one end 21*a* of the second bus bar 21 as well as the end of the electric wire 22 is fixed to the battery post 18*b* at the time of the maintenance, a play is generated in a direction Z cross perpendicularly to the terminal fitting/detaching direction P.

In this case, if there is a mounting error when the second bus bar 21 as a receiving side terminal is fixed to the battery post 18*b*, since the horizontal portion 21*c* of the second bus bar 21 is bent in the vertical direction with respect to the vertical portion 21*b*, a displacement due to the mounting error occurs in a widthwise direction (direction Z) of the main body side terminal 20*b*. However, even if the displacement occurs in the main body side terminal 20*b* on the plug side bus bar 21 side, since the width D2 of the terminal insertion groove 32, 32 of the plug side terminal 31*b* is larger than the width D1 of the main body side terminal 20*b*, the main body side terminal 20*b* is fitted securely into the terminal insertion groove 32, 32 of the plug side terminal 31*b*.

Therefore, even if the displacement in the direction Z occurs in the main body side terminal 20*b* of the second bus bar 21 due to the mounting error, since the sliding force of the plug main body 29 of the plug 28 is not increased when the pair of main body side terminals 20*a* and 20*b* are fitted into the pair of plug side terminals 31*a* and 31*b*, the operability of the plug 28 can be improved.

In addition, even in the case where the plug side terminals 31 are pulled out of the main body side terminals 20*a* and 20*b*, if the displacement in the direction Z occurs in the main body terminal 20*b* of the second bus bar 21, the sliding force of the plug 28 is not increased. For this reason, the operability of the plug 28 can be improved.

Needless to say, even if a displacement in the direction Z occurs in the first bus bar 19 due to the mounting error, the displacement can be absorbed similarly. Further, if a displacement in the direction Z occurs in the plug side terminals 31*a* and 31*b* due to the mounting error, the mounting looseness can be absorbed similarly.

In addition, in the present embodiment, since both the first bus bar 19 and the second bus bar 21 are extended so that their other ends are composed as the main body side terminals 20*a* and 20*b*, a number of parts is reduced, and thus installation becomes easy and the cost is lowered.

In addition, in the present embodiment, since the one end of the terminal insertion groove 32,32 is opened to the outside, the outer side of the opened portion is utilized so that the substantial width D2 of the terminal insertion groove can be easily longer than the width D1 of the main body side terminals 20*a* and 20*b* without giving a large dimension to the plug side terminals 31*a* and 31*b*.

In the present embodiment, the plug side terminals 31*a* and 31*b* are formed by bending a copper plate material with a spring characteristic so as to have the pair of U-shaped portions, and the terminal insertion groove as the terminal insertion portion is composed by a space surrounded by the U-shaped portions. However, the terminal insertion groove 32, 32 may be constituted by a nipped space provided between a pair of nipping pieces.

In addition, the apparatus main body 10 is provided with the engagement groove 36, and the plug main body 29 is provided with the engagement projection 35. However, the apparatus main body 10 may be provided with an engagement projection, and the plug main body 19 may be provided with an engagement groove.

This invention may be embodied in several forms without departing from the spirit of essential characteristics thereof.

What is claimed is:

1. A power-supply breaker apparatus, comprising:

a fuse provided between a power supply and a load in an electric circuit, the electric circuit becoming conductive through the fuse;

an apparatus main body housing the fuse;

a first bus bar whose one end is fixed to one fuse terminal of the fuse, the other end of the first bus bar being extended so as to be composed as one of a pair of main body side terminals;

a second bus bar fixed to one of the power supply and the load, the other end of the second bus bar being extended parallel with the first bus bar so as to be composed as the other one of the pair of main body side terminals;

a plug housing chamber housing a plug movably in a fitting/detaching direction in the apparatus main body; and a pair of plug side terminals being conductive with each other in the plug, respective terminal insertion widths of the pair of plug side terminals being wider than corresponding widths of the pair of main body side terminals, wherein the plug moves in the fitting/detaching direction so that the pair of plug side terminals are freely fitted into and detached from the pair of main body side terminals.

2. A power-supply breaker apparatus according to claim 1, wherein the pair of plug side terminals are composed of one plate member.

3. A power-supply breaker apparatus according to claim 1, wherein a pair of conduciveness detection-use terminals detecting a conductive state of the electric circuit are provided respectively in the apparatus main body and the plug main.

4. A power-supply breaker apparatus according to claim 3, wherein the plug has a plug main body and a slider which is movable in the terminal fitting/detaching direction with respect to the plug main body.

5. A power-supply breaker apparatus according to claim 4, wherein the pair of plug side terminals are provided to the plug main body, and the pair of conduciveness detection-use terminals of the plug are provided to the slider.

6. A power-supply breaker apparatus according to claim 4, wherein the plug main body is freely engaged and detached according to a movement of the slider in the fitting/detaching direction.

7. A power-supply breaker apparatus according to claim 4, wherein fitting/detaching timing of the pair of first plug side terminals and the pair of main body side terminals differs from timing of the pair of conduciveness detection-use terminals of the apparatus main body and the pair of conduciveness detection-use terminals of the plug.

* * * * *

UNITED STATES PATENT AND TRADEMARK OFFICE

CERTIFICATE OF CORRECTION

PATENT NO. : 6,333,845 B1

DATED : December 25, 2001

INVENTOR(S) : Shigemi Hashizawa, Hidehiko Kuboshima and Masayuki Karamatsu

It is certified that error appears in the above-identified patent and that said Letters Patent is hereby corrected as shown below:

Column 8,
Line 30, "are" should read -- is --.
Line 33, "conduciveness" should read -- conductiveness --.
Line 36, "main" should be deleted.
Line 42, "are" should read -- is --.
Line 43, "conduciveness" should read -- conductiveness --.
Line 44, "are" should read -- is --.
Line 50, "first" should read -- the --.
Line 51, "of main" should read -- of the main --.
Line 52, "conduciveness" should read -- conductiveness --.
Line 54, "conduciveness" should read -- conductiveness --.

Signed and Sealed this

Thirtieth Day of July, 2002

*Attest:*

JAMES E. ROGAN

*Attesting Officer* *Director of the United States Patent and Trademark Office*